US 8,477,638 B2
Jul. 2, 2013

(12) United States Patent
Burney et al.

(54) LATENCY ENHANCEMENTS FOR MULTICAST TRAFFIC OVER SPATIAL REUSE PROTOCOL (SRP)

(75) Inventors: Shahzad Omar Burney, Santa Clara, CA (US); Abdul Khader, San Jose, CA (US); Muhammad Waris Sagheer, San Jose, CA (US)

(73) Assignee: CISCO Technology, Inc., San Jose, CA (US)

( * ) Notice: Subject to any disclaimer, the term of this patent is extended or adjusted under 35 U.S.C. 154(b) by 228 days.

(21) Appl. No.: 12/326,749

(22) Filed: Dec. 2, 2008

(65) Prior Publication Data

US 2010/0135295 A1    Jun. 3, 2010

(51) Int. Cl.
  *G01R 31/08*    (2006.01)
(52) U.S. Cl.
  USPC ........................................... 370/252; 370/390
(58) Field of Classification Search
  None
  See application file for complete search history.

(56) References Cited

U.S. PATENT DOCUMENTS

| | | | | |
|---|---|---|---|---|
| 6,091,705 A * | 7/2000 | Regula | ........................... | 370/223 |
| 6,202,082 B1 * | 3/2001 | Tomizawa et al. | ............ | 709/201 |
| 6,529,300 B1 * | 3/2003 | Milton et al. | ................... | 398/59 |
| 6,563,833 B1 * | 5/2003 | Wool et al. | ................... | 370/404 |
| 6,594,232 B1 * | 7/2003 | Dupont | ......................... | 370/224 |
| 6,738,582 B1 * | 5/2004 | Moshe et al. | .................. | 398/98 |
| 6,820,210 B1 * | 11/2004 | Daruwalla et al. | ............. | 714/4.1 |
| 6,912,196 B1 * | 6/2005 | Mahalingaiah | ............... | 370/216 |
| 6,952,397 B2 * | 10/2005 | Mor et al. | ...................... | 370/223 |
| 7,043,541 B1 * | 5/2006 | Bechtolsheim et al. | ....... | 709/223 |
| 7,054,951 B1 * | 5/2006 | Kao et al. | ....................... | 709/242 |
| 7,076,787 B2 * | 7/2006 | Cheon et al. | ................... | 719/321 |
| 7,317,681 B1 * | 1/2008 | Ben-Dvora et al. | ........... | 370/224 |
| 7,324,440 B2 * | 1/2008 | Takagi et al. | .................. | 370/222 |
| 7,362,718 B2 * | 4/2008 | Kakivaya et al. | ............. | 370/254 |
| 7,376,138 B1 * | 5/2008 | Cotter | ........................... | 370/403 |
| 8,090,880 B2 * | 1/2012 | Hasha et al. | ................... | 709/251 |
| 2002/0144190 A1 * | 10/2002 | Bruckman | ...................... | 714/43 |
| 2002/0181478 A1 * | 12/2002 | Shizume | ........................ | 370/401 |
| 2003/0147345 A1 * | 8/2003 | Takagi et al. | .................. | 370/222 |
| 2003/0225916 A1 * | 12/2003 | Cheon et al. | ................... | 709/251 |
| 2005/0041595 A1 * | 2/2005 | Uzun et al. | ..................... | 370/252 |
| 2006/0212551 A1 * | 9/2006 | Kao et al. | ....................... | 709/220 |

OTHER PUBLICATIONS

Request for Comment—RFC2892 titled "The Cisco SRP MAC Layer Protocol"). Aug. 2000, pp. 1-52.

* cited by examiner

*Primary Examiner* — Marsha D Banks Harold
*Assistant Examiner* — Hooman Houshmand
(74) *Attorney, Agent, or Firm* — Patterson & Sheridan LLP (57) ABSTRACT

Techniques for routing multicast packets in an SRP topology when there is a ring-wrap condition are provided. By routing multicast packets on both rings simultaneously, multicast packets may reach their destination receiver(s) with a fewer number of hops than if the packets had to traverse portions of both inner and outer ring paths when a ring wrapped condition exists.

15 Claims, 8 Drawing Sheets

LATENCY ENHANCEMENTS FOR MULTICAST TRAFFIC OVER SPATIAL REUSE PROTOCOL (SRP)

BACKGROUND

Technical Field

Embodiments of the present disclosure generally relate to network communications and, more particularly, to techniques that may help reduce latency in redundant network architectures.

Service providers often utilize some form of network redundancy in order to provide more reliable service. In the event of a failure in a primary path, network traffic may still be routed using a redundant path. One technique to provide redundancy is to utilize a dual ring topology according to a spatial reuse protocol (SRP). SRP utilizes a bidirectional ring topology that may be viewed as two symmetric rings with traffic routed in opposite ("counter-rotating") paths. Both rings may be used concurrently to transport data and control packets.

Due a potential increase in aggregate bandwidth of the ring topology provided, service providers may utilize SRP for a variety of applications, such as delivery of broadcast video over using internet protocol (IP) over SRP. Current implementation so sending multicast IP packets using SRP relies on a technique called source stripping, in which the multicast packets are terminated at a source node after traversing the ring. The source node (a node with a multicast source) sends a multicast packet on a selected ring (e.g., selected based on a hash algorithm). The multicast packet will rotate around the entire ring. Nodes having matching destination addresses accepting the packet, while the packet will finally be stripped (its transmission terminated) by the source node.

In the event of a failure on one of the rings, SRP will establish a "ring wrap" to provide an alternate route using the other ring. Thus, in a ring wrap, both inner and outer rings will see the multicast packet. To ensure a receive node does not accept the packet twice, the receive node will accept the packet only if the ring_id matches the physical ring. Unfortunately, this can lead to increased latency from the multicast source to destination, as the multicast packet will take more number of hops passing through both the inner and outer ring until the multicast packet reaches the receive node with a matching ring_id.

Accordingly, what is needed is a technique for reducing multicast latency in a ring wrap condition.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Embodiments of the present disclosure generally provide techniques that may reduce latency in routing multicast packets in an SRP topology when there is a ring-wrap condition. By routing multicast packets on both rings simultaneously, multicast packets may reach their destination receiver(s) with a fewer number of hops than if the packets had to traverse portions of both inner and outer ring paths when a wrap condition exists.

An Example SRP Topology

Figure 1:
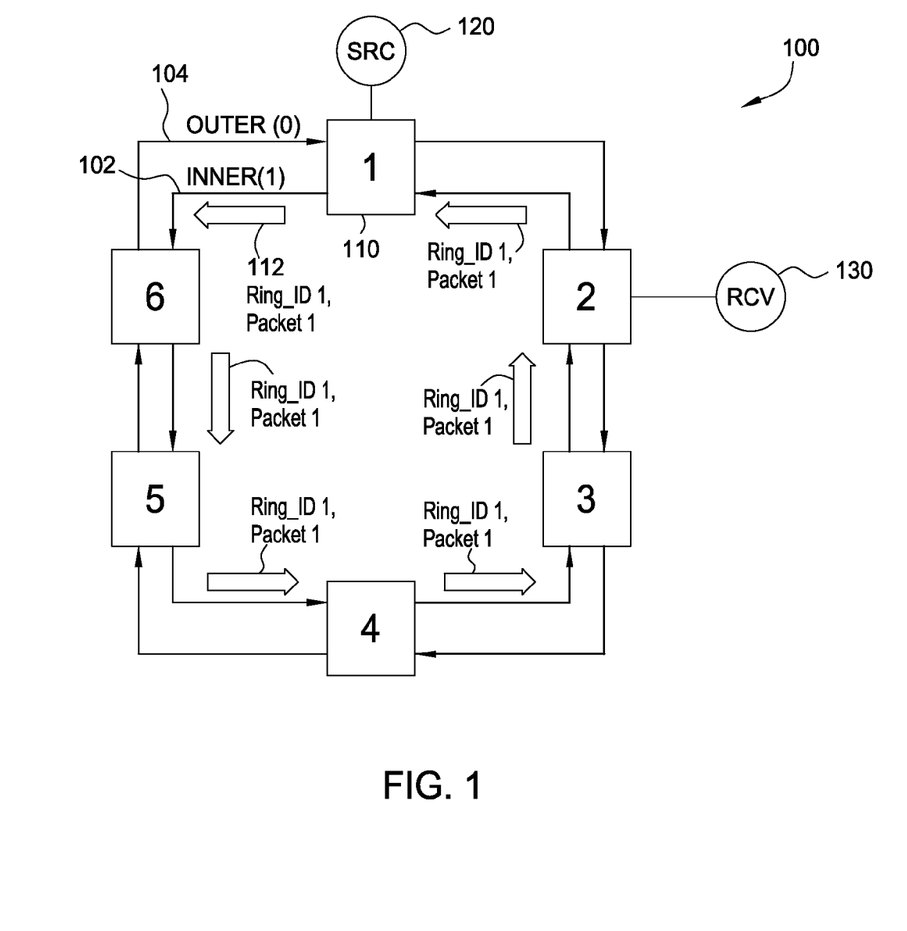
FIG. 1 illustrates an example spatial reuse protocol (SRP) topology.

FIG. 1 illustrates an example spatial reuse protocol (SRP) topology 100, including a plurality of nodes 110 (illustratively nodes 1-6). The nodes are interconnected via counter-rotating inner and outer rings 102 and 104 that may be used to route packets between source devices (e.g., multicast source 120 coupled with node 1) and receiver devices (e.g., multicast receiver 130 coupled with node 2).

The inner and outer rings may utilize any suitable transmission media (e.g., cable wire or optical fiber) providing a path for the transmission of data (e.g., E-mail, video, multimedia, or voice) between two or more nodes. The data can be transferred in accordance with any suitable network protocol, such as Internet Protocol (IP), asynchronous transfer mode (ATM), or synchronous optical network/synchronous digital hierarchy (SONET/SDH) over optical transmission media.

In this type of network configuration (a dual-ring topology), data can be transmitted from a source node to a destination node (often through intermediary nodes) by transmitting data along one of the two rings. The rings may have traffic flowing simultaneously in opposing directions. For example, control information may be routed in a direction opposite the control information's respective data. The ring used for transmission may be selected, for example, using a hash algorithm on a destination address field of a packet being routed.

FIG. 1 illustrates an example multicast packet 112 traversing the inner ring 102 (with Ring_ID 1). As the multicast packet 112 reaches each successive node, it may be routed to a receiver device if the node is part of a multicast group targeted by the packet and forwarded on to the next node. If the node is not part of the multicast group, the packet is simply forwarded on until it reaches the node that originated the packet (the source node). At the source node, the packet is terminated based on a match with the source address of the packet and the node, generally referred to as source stripping.

Figure 2:
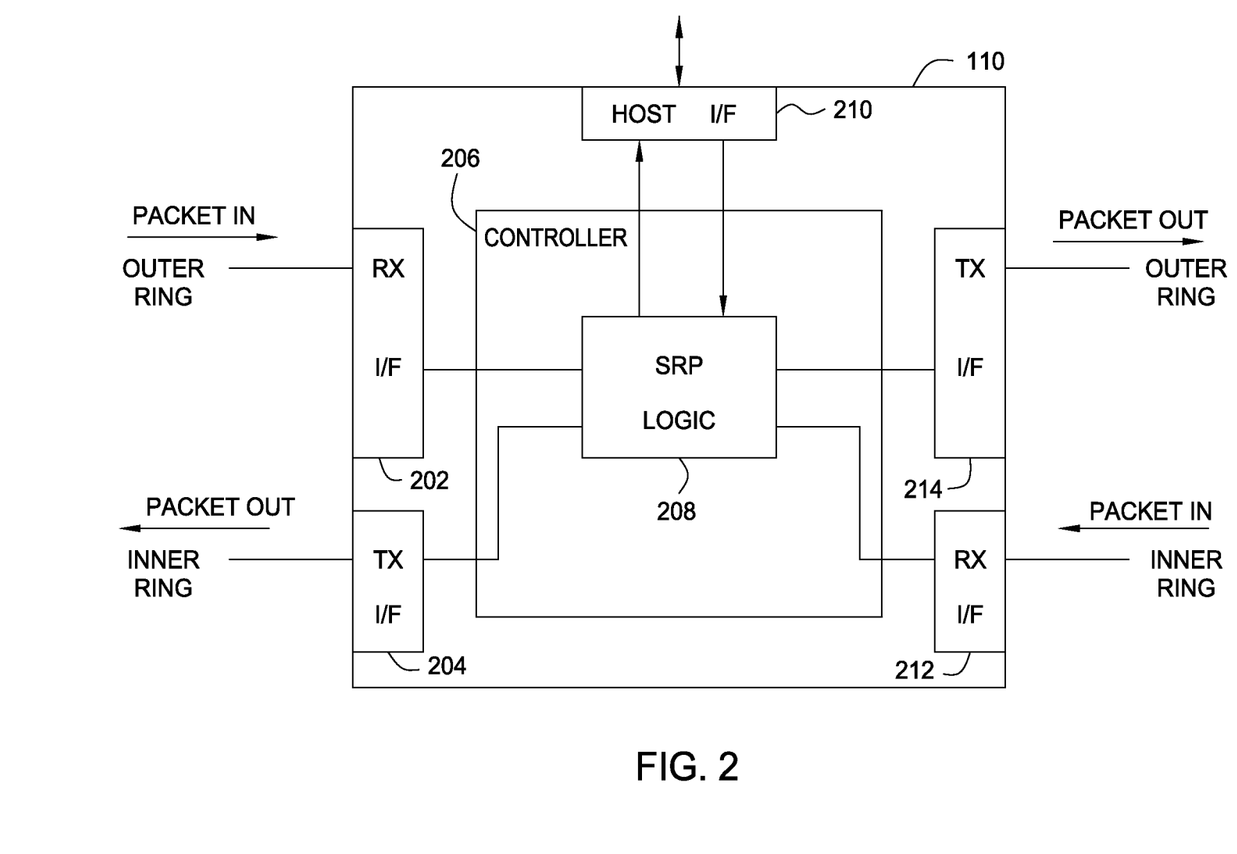
FIG. 2 illustrates a logic diagram of example components of a node capable of implementing SRP.

FIG. 2 illustrates a logic diagram of example components of one embodiment of a node 110 capable of implementing SRP. In coming packets on the inner ring and outer ring are routed through receive (Rx) interfaces 202 and 212, respectively. The Rx interfaces may include physical layer components which provide an electrical, mechanical and procedural interface to receive and decode the raw bit stream of the packets transmitted over the physical medium linking the nodes.

The Rx interfaces provide decoded packets to a controller 206, which may include SRP logic 208. The SRP logic 208 may be configured to decide whether to route packets on to a host interface 210, for example, based on a destination address of the incoming packets, whether to forward the packets on, or to terminate the packets at the node 110 (e.g., based on source stripping if the node address matches the source address of the packet or some other stripping criteria). Packets routed to the host interface 210 may be forwarded on to a receiver device, such as a television in the case of multicast video.

The SRP logic 208 may also send outbound packets on the inner ring and outer ring through transmit (Tx) interfaces 204 and 214, respectively. The Tx interfaces may include physical layer components which provides an electrical, mechanical, and procedural interface to transmit the packets as a raw bit stream over the physical medium linking the nodes. The outbound packets may include packets originating at node 110, for example, received from a host device via host interface 210, or packets received from a previous node to be forwarded on.

SRP logic 208 may also be configured to perform "ring wrapping" operations, receiving a packet on one ring and outputting the packet on the other ring. For example, in the event a failure detected on the outbound side of the outer ring, SRP logic 208 may implement a "ring wrap" forwarding packets received on the inner ring via Rx interface 212 on the outer ring via Tx interface 214.

As will be described in greater detail below, when a ring wrap condition is detected, SRP logic 208 of a source node originating a multicast packet transmission (assuming the source node is not implementing a wrap itself) may be configured to simultaneously route the multicast packet on both the inner and outer rings in an effort to reduce latency. Further, SRP logic 208 of a node implementing a ring wrap (referred to herein as a "wrapped node") may be configured to strip packets it receives in an effort to conserve bandwidth resources.

Figure 3:
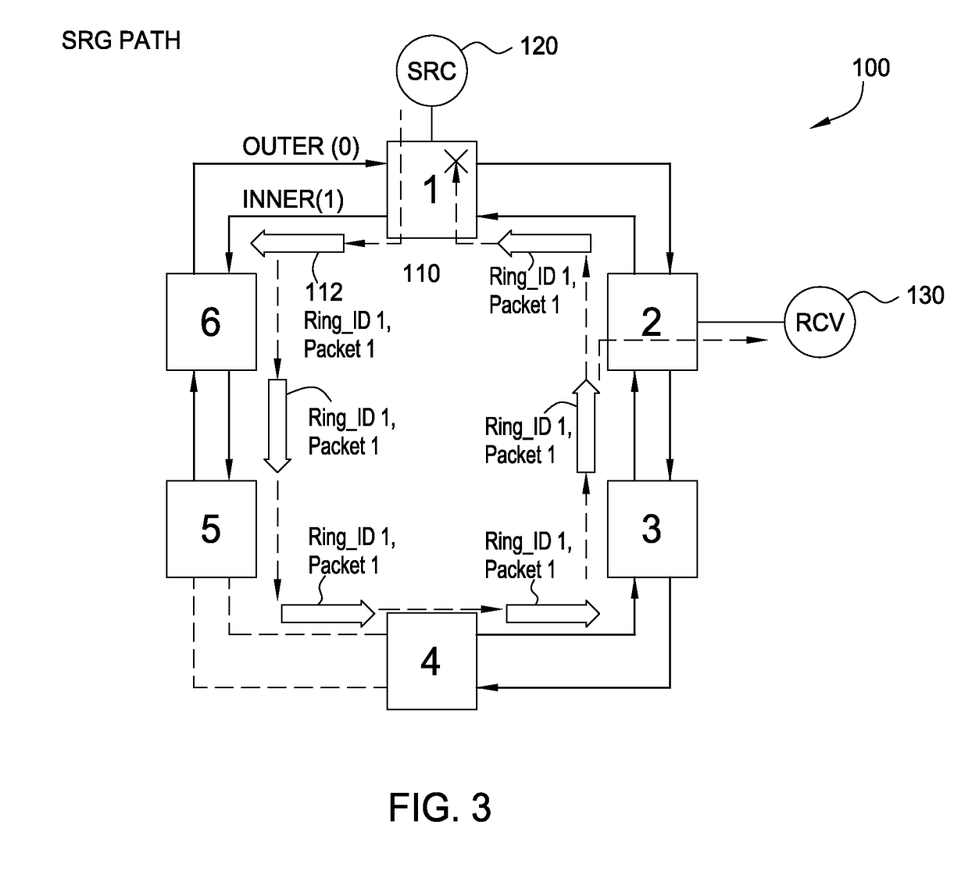
FIG. 3 illustrates example packet routing according to SRP assuming no ring wrap condition in the SRP topology of FIG. 1.
Figure 4:
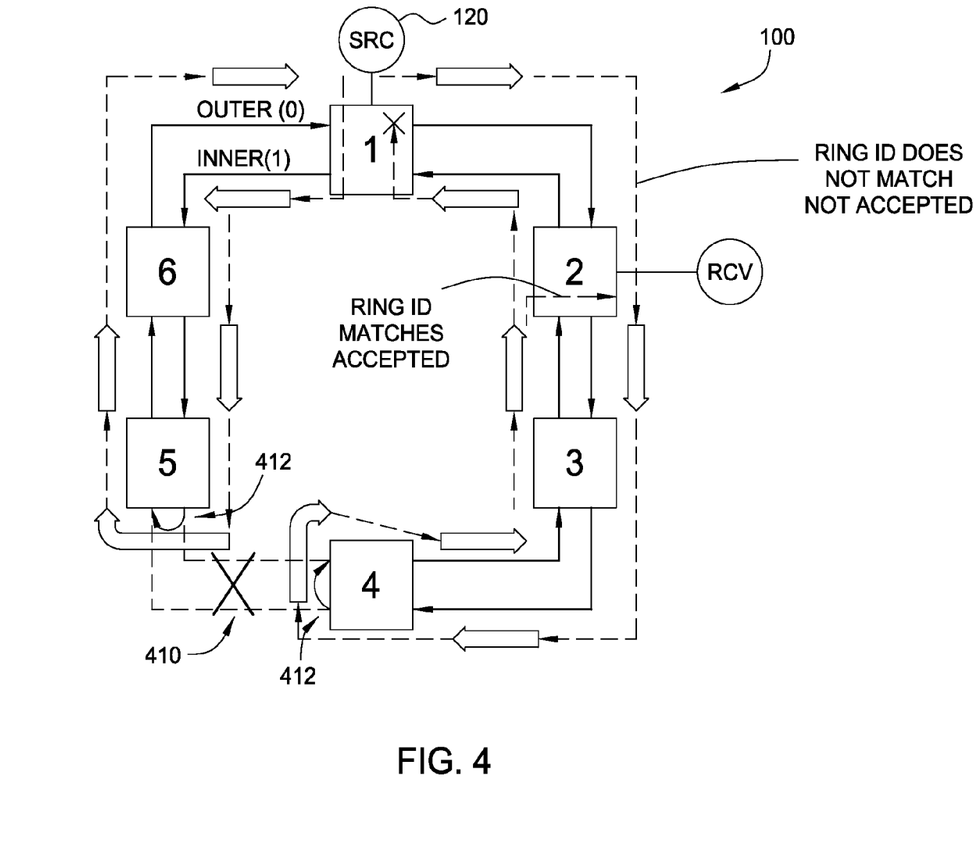
FIG. 4 illustrates example packet routing according to SRP assuming a ring wrap condition in the SRP topology of FIG. 1.

FIGS. 3 and 4 illustrate SRP routing of a multicast packet during a normal operating state (no ring wraps) and during a ring wrap state, respectively. The illustrated examples assume a multicast packet 112 transmitted from multicast source 120 at node 1 (N1) to multicast receiver 130 at node 2 (N2), with the packet routed on the inner ring (Ring_ID 1).

As illustrated in FIG. 3, the multicast packet 112 will traverse the entire inner ring 102 following the path N1→N6→N5→N4→N3→N2→N1. Node 2 will receive the packet (e.g., based on the multicast address and because the Ring_ID in the packet and the physical ring on which it is received) and node N1 will source strip the packet (based on the source address). Table 1 below summarizes SRP routing of the packet in this state with no ring wraps:

TABLE 1

| SOURCE | DESTINATION | HOP COUNT (Source to Destination) | PATH (Source to Destination) | LATENCY (ms) |
|---|---|---|---|---|
| N1 | N2 | 5 | N1→N6→N5→N4→N3→N2 | 50 |

Table 1 assumes 10 ms latency per hop, resulting in a total latency of 50 ms.

As illustrated in FIG. 4, a failure 410 between nodes 4 and 5 will result in ring wraps 412 at these nodes. As illustrated, the ring wraps 412 will result in the multicast packet 112 being seen on both the inner ring 102 and the outer ring 104. Thus, in this ring wrap state, multicast packet 112 follows the path N1→N6→N5→N6→N1→N2→N3→N4→N3→N2→N1, before being source stripped at node 1.

To ensure a receive node does not receive the same packet twice, the receive node will typically only accept a packet if the ring ID in the packet matches the physical ring ID it is received on. Thus, in this example, node 2 will only receive the packet after it traverses through node 4 and returns to node 2 on the inner ring 102. Table 2 below summarizes SRP routing of the packet in this ring wrap state:

TABLE 2

| SOURCE | DESTINATION | HOP COUNT (Source to Destination) | PATH (Source to Destination) | LATENCY (ms) |
|---|---|---|---|---|
| N1 | N2 | 9 | N1→N6→N5→N6→N1→N2→N3→N4→N3→N2 | 90 |

Again assuming a latency of 10 ms latency per hop, in this ring wrap state, multicast packet 112 reaches node N2 with a total latency of 90 ms compared with 50 ms when the inner ring 102 is chosen in the non-wrap state.

Reduced Latency SRP Routing in a Ring Wrap State

Certain embodiments of the present disclosure, however, may be utilized to reduce the latency in routing a multicast packet in a ring-wrap state. To reduce latency, when a ring-wrap state is detected, a source node may a send multicast packet on both inner and outer rings. As will be described in greater detail below, this may result in a multicast packet reaching the receive node on a physical ring that matches the ring ID of the packet, thus resulting in the packet being accepted by the receive node with less latency than with conventional routing using a single ring to route the packet.

For certain embodiments, because the packet routed on both loops will reach each node on its path to the nodes where the ring is wrapped, rather than utilize conventional source stripping, these "wrapped" nodes may be configured to strip the packet to avoid needlessly routing the packet back to the source node.

Figure 5:
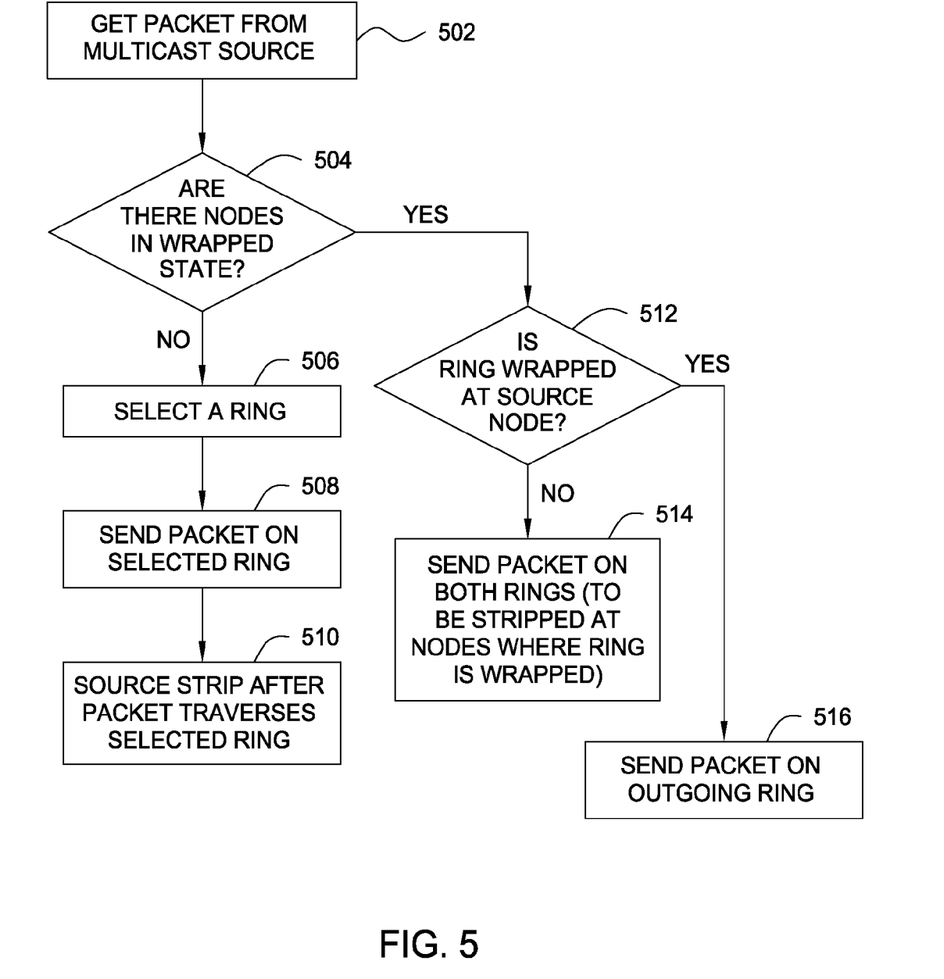
FIG. 5 illustrates example operations for reduced latency packet routing using SRP in accordance with certain embodiments of the present disclosure.

FIG. 5 illustrates example operations for routing a multicast packet in accordance with certain embodiments of the present disclosure. The operations may be performed, for example, by a node 110 to route a multicast packet received from a multicast source 120.

The operations begin, at 502, by obtaining a multicast packet from a multicast source. If there are no nodes in the wrapped state (e.g., no device or transmission medium failures between nodes resulting in a link failure), as determined at 504, the packet may be routed in a conventional manner, as illustrated in FIG. 3. A ring is selected, at 506, the packet is sent on the selected ring, at 508, and the packet is source stripped (after traversing the entire selected ring), at 510.

On the other hand, if there are nodes in a wrapped state, assuming the ring is not wrapped at the source node (as determined at 512), the packet may be sent on both rings, at 514. This scenario is illustrated in FIG. 6, again assuming nodes 4 and 5 are wrapped. In this case node 1 sends a multicast packet 112 on both the inner ring 102 (shown as multicast packet $112_1$ with Ring ID 1) and on the outer ring 104 (shown as multicast packet $112_0$ with Ring ID 0).

Figure 6:
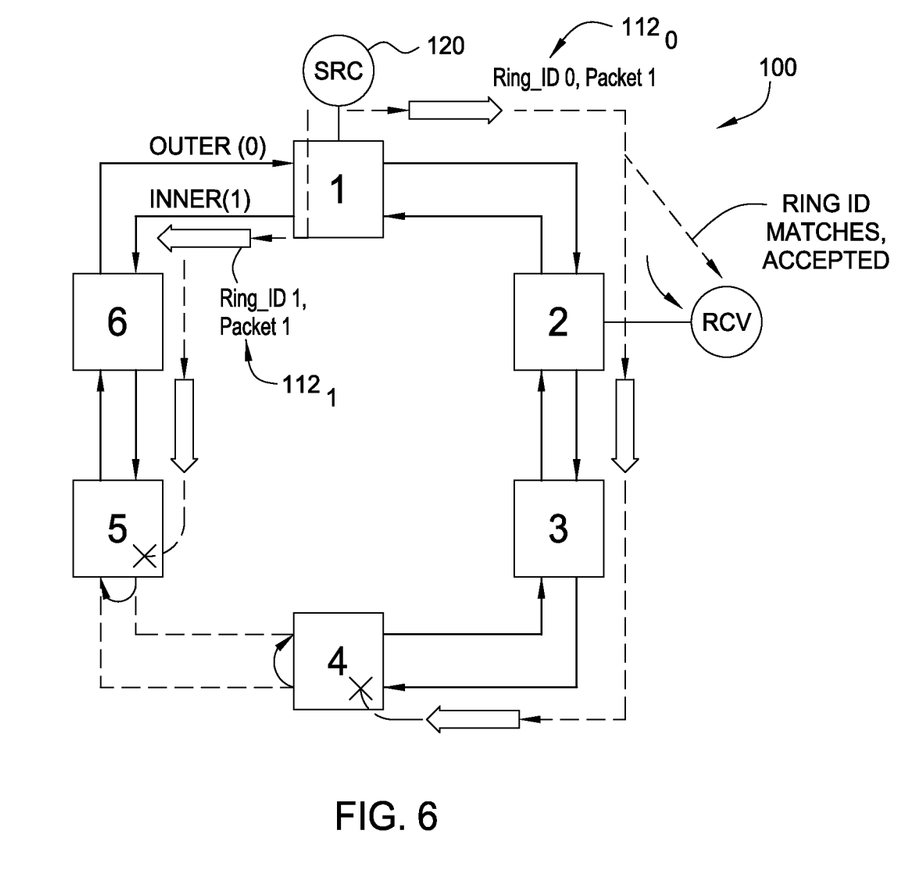
FIG. 6 illustrates example reduced latency packet routing using SRP in accordance with certain embodiments of the present disclosure.

As illustrated, the multicast packet $112_1$ will traverse the inner ring 102 until it is stripped at wrapped node 5, following the path N1→N6→N5. Multicast packet $112_0$ will traverse the outer ring 104 until it is stripped at wrapped node 4, following the path N1→N2→N3→N4. In this case, however, because the Ring ID of multicast packet $112_0$ matches the physical ring on which it is received, node 2 will accept multicast packet $112_0$ with reduced latency relative to conventional SRP routing. Table 3 below summarizes reduced latency SRP routing of the multicast packet $112_0$ in this wrap state:

TABLE 3

| SOURCE | DESTINATION | HOP COUNT (Source to Destination) | PATH (Source to Destination) | LATENCY (ms) |
|---|---|---|---|---|
| N1 | N2 | 1 | N1→N2 | 10 |

As illustrated, in this example, latency may be reduced from 90 to 10 when the multicast packet is routed on both the inner and outer rings.

It should be noted that, in the case that a source node is a wrapped node, as determined at 512, there will only be one ring available for sending a packet. In this case, the packet may simply be sent on the outgoing ring, at 516, and will traverse that ring until it reaches the other wrapped node.

Figure 7:
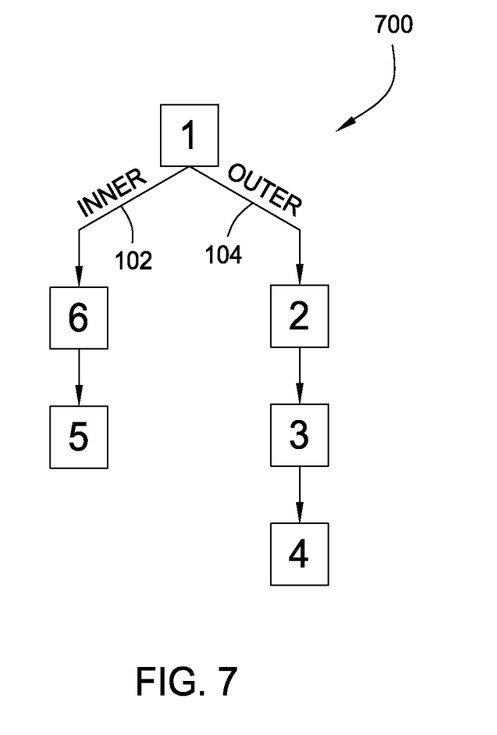
FIG. 7 illustrates an example tree structure in which an SRP topology is effectively transformed in accordance with certain embodiments of the present disclosure.

As illustrated in FIG. 7, SRP routing as proposed herein effectively transforms a conventional dual-ring topology into a tree structure 700. In the tree structure, one branch from node 1 on the outer ring 104 includes nodes 2, 3 and 4, while a second branch from node 1 on the inner ring 102 includes nodes 6 and 5. Because the total latency for a multicast packet to reach any receive node on one of the branches is less than if the same packet had to pass through the receive node and back through a wrapped node, the SRP routing proposed herein may offer significant improvements in performance over conventional routing. In the case that a source node is a wrap node, there will only be a single branch along the available outgoing ring.

Figure 8:
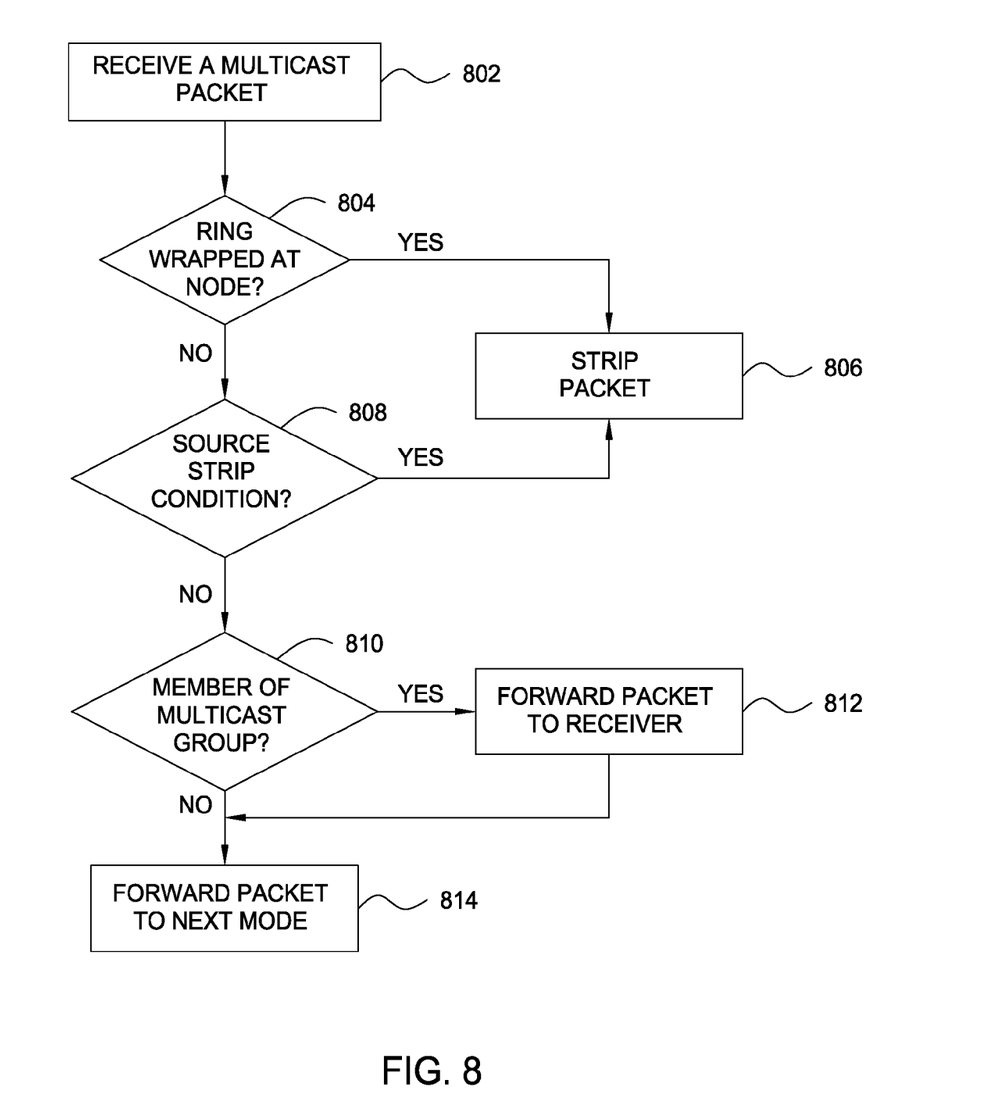
FIG. 8 illustrates example operations for reduced latency routing of a received packet using SRP in accordance with certain embodiments of the present disclosure.

FIG. 8 illustrates example operations that may performed by a node receiving a multi-cast packet (including a source node receiving a packet that has traversed an entire (non-wrapped ring). The operations begin, at 802, by receiving a multicast packet from another node. As noted above, if the node receiving the multicast packet is a wrapped node, as determined at 804, the multicast packet may be stripped, at 806. For example, wrapped nodes 4 and 5 in FIG. 6 are shown stripping the multicast packets in this manner (as indicated by the X). This may conserve bandwidth resources, as the multicast packet will have already traversed all nodes between the source node and the wrap node on the ring.

If the ring is not wrapped, the multicast packet may be handled in a conventional manner. For example, if a source stripping condition is met (e.g., the node receiving the packet is the source node that originated the multicast packet), as determined at 808, the packet may be stripped, at 806. For example, node 1 is shown source stripping the multicast packet 112 in FIG. 3 after it traverses the entire inner ring 102.

If the source stripping condition is not met, and the receiving node is not in a multicast group targeted by the multicast packet, as determined at 810, the multicast packet may simply be forwarded on to the next node, at 814. For example, nodes 6 and 3 in FIG. 6 are not receive nodes and simply forward the multicast packets to the next nodes 4 and 5, respectively.

If the receiving node is in the multicast group targeted by the multicast packet, the multicast packet may be first forwarded to the receiver, at 812, before being forwarded on to the next node, at 814. For example, node 2 in FIG. 6 is shown forwarding multicast packet $112_0$ to multicast receiver 130 before forwarding multicast packet $112_0$ on to node 3.

If there are no nodes in the wrapped state (e.g., no device or transmission medium failures between nodes resulting in a link failure), as determined at 504, the packet may be routed in a conventional manner, as illustrated in FIG. 3. A ring is selected, at 506, the packet is sent on the selected ring, at 508, and the packet is source stripped (after traversing the entire selected ring), at 510.

By utilizing both rings to route multicast packets in a dual-ring topology when a ring-wrap condition exists, the techniques presented herein may significantly reduce latency and overall system performance. Further, by stripping multicast packets at nodes where a ring is wrapped, bandwidth resources may be conserved.

While the techniques presented herein have been described with reference to a dual-ring SRP topology with a limited number of nodes as a particular application example, those skilled in the art will appreciate that the techniques presented herein may be utilized in a wide variety of redundant systems utilizing multiple rings with any number of nodes.

While the foregoing is directed to embodiments of the present disclosure, other and further embodiments of the disclosure may be devised without departing from the basic scope thereof, and the scope thereof is determined by the claims that follow.

The invention claimed is:

1. A method, comprising:
   obtaining, by a source node in a multi-ring topology, data to be transmitted to one or more other nodes in the multi-ring topology;
   determining whether the multi-ring topology is in a wrapped state wherein one or more nodes in the multi-ring topology, other than the source node, are configured to receive a packet on a first ring of the multi-ring topology and transmit the packet on a second ring of the multi-ring topology; and if the multi-ring topology is not in a wrapped state, then transmitting the data in one or more multicast packets on either the first ring or the second ring of the multi-ring topology, wherein the one or more multicast packets include a ring identification corresponding to the ring on which the multicast packets are transmitted, or if the multi-ring topology is in a wrapped state:

transmitting the data substantially simultaneously in multicast packets on both the first ring and the second ring of the multi-ring topology, wherein a first one or more multicast packets are transmitted on the first ring and a second one or more multicast packets are transmitted on the second ring containing copies of data of the first one or more multicast packets, and wherein the first one or more multicast packets include a ring identification corresponding to the first ring and the second one or more multicast packets include a ring identification corresponding to the second ring, stripping, by a first node causing the wrapped state, the first one or more multicast packets transmitted over the first ring when the first one or more multicast packets reach the first node, stripping, by a second node causing the wrapped state, the second one or more multicast packets transmitted over the second ring when the first one or more multicast packets reach the second node.

2. The method of claim 1, further comprising receiving the data from a multicast source.

3. The method of claim 1, wherein the data comprises data for a multicast video transmission.

4. The method of claim 1, wherein the multi-ring topology comprises a dual-ring spatial reuse protocol (SRP) topology.

5. The method of claim 1, wherein transmitting the data in one or more multicast packets on both the first ring and the second ring of the multi-ring topology comprises:

transmitting a first multicast packet on the first ring of the multi-ring topology, the first multicast packet having a ring identification corresponding to the first ring; and transmitting a second multicast packet on the second ring of the multi-ring topology substantially simultaneously with transmitting the first multicast packet on the first ring, the second multicast packet having a ring identification corresponding to the second ring.

6. The method of claim 1, further comprising:

receiving at the source node the one or more multicast packets transmitted on a ring of the multi-ring topology, the one or more multicast packets having traversed the entire ring; and terminating transmission of the one or more multicast packets.

7. The method of claim 1, wherein one or more rings of the multiple rings comprise optical transmission media.

8. An apparatus, comprising:

transmit interface logic configured to transmit multicast packets to nodes in a multi-ring topology, wherein the multi-ring topology includes a source node that receives data to be transmitted to one or more other nodes in the multi-ring topology routing logic configured to:

determine if the multi-ring topology is in a wrapped state wherein one or more nodes in the multi-ring topology, other than the source node, are configured to receive a packet on a first ring of the multi-ring topology and transmit the packet on a second ring of the multi-ring topology, and if the multi-ring topology is not in a wrapped state, then transmit the data in one or more multicast packets on either the first ring or the second ring of the multi-ring topology, wherein the one or more multicast packets include a ring identification corresponding to the ring on which the multicast packets are transmitted, or if the multi-ring topology is in a wrapped state, then transmit the data substantially simultaneously in multicast packets on both the first ring and the second ring of the multi-ring topology, wherein a first one or more multicast packets are transmitted on the first ring and a second one or more multicast packets are transmitted on the second ring containing copies of data of the first one or more multicast packets, and wherein the first one or more multicast packets include a ring identification corresponding to the first ring and the second one or more multicast packets include a ring identification corresponding to the second ring;

wherein a first one of the nodes causing the wrapped state is configured to strip the first one or more multicast packets transmitted over the first ring when the first one or more multicast packets reach the first node; and wherein a second one of the nodes causing the wrapped state is configured to strip the second one or more multicast packets transmitted over the second ring when the first one or more multicast packets reach the second node, and wherein the wrapped results from a network link going down between the first and second node.

9. The apparatus of claim 8, further comprising interface logic for receiving the data from a multicast source.

10. The apparatus of claim 8, wherein the data comprises data for a multicast video transmission.

11. The apparatus of claim 8, wherein the multi-ring topology comprises a dual-ring spatial reuse protocol (SRP) topology.

12. The apparatus of claim 8, wherein the routing logic is configured to transmit the data in one or more multicast packets on both the first ring and the second ring of the multi-ring topology by:

transmitting a first multicast packet on the first ring of the multi-ring topology, the first multicast packet having a ring identification corresponding to the first ring; and transmitting a second multicast packet on the second ring of the multi-ring topology, the second multicast packet having a ring identification corresponding to the second ring.

13. The apparatus of claim 8, further comprising:

receive interface logic for receiving the one or more multicast packets transmitted on a ring of the multi-ring topology, the one or more multicast packets having traversed the entire ring; and wherein the routing logic is configured to terminate transmission of the one or more multicast packets at the apparatus.

14. The apparatus of claim 8, wherein one or more rings of the multi-ring topology comprise optical transmission media.

15. A system, comprising:

a plurality of nodes connected to a spatial reuse protocol (SRP) topology that includes a first ring and a second ring, wherein packets may be forwarded between a first node of the plurality of nodes and a second node of the plurality of nodes via either the first ring or the second ring;

a wrap node configured to detect a failure in a link between the wrap node and an adjacent node of the plurality of nodes on either the first ring or the second ring and, determining that a failure has occurred, implement a wrapped state wherein packets received on the first ring are transmitted on the second ring;

a source node connected to the SRP topology and configured to:

receive data to be transmitted to one or more other nodes in the multi-ring topology in one or more multicast packets, determine whether the SRP topology is in the wrapped state, and if the SRP topology is not in a wrapped state, then transmitting a first multicast packet of the one or more multi-cast packets on either the first ring or the second ring, wherein the first multicast packet includes a ring identification that corresponds to either the first ring or the second ring corresponding to the ring on which the first multicast packet is transmitted, or if the SRP topology is in a wrapped state, then transmitting the first multi-cast packet on the first ring and substantially simultaneously transmitting a second multicast packet on the second ring containing a copy of the data of the first multicast packet, wherein the first multicast packet includes a ring identification that corresponds to the first ring and the second multicast packet includes a ring identification that corresponds to the second ring;

wherein the wrap node is further configured to strip the first one or more multicast packets transmitted over the first ring when the first one or more multicast packets reach the first node; and wherein the adjacent node is configured to strip the second one or more multicast packets transmitted over the second ring when the first one or more multicast packets reach the second node, and wherein the wrapped results from a network link going down between the first and second node.

* * * * *